(12) United States Patent
Takeda et al.

(10) Patent No.: US 6,787,487 B1
(45) Date of Patent: Sep. 7, 2004

(54) WATER VAPOR-PERMEABLE AND WATERPROOF MATERIAL AND METHOD FOR MANUFACTURING THE SAME

(75) Inventors: Keiji Takeda, Shizuoka (JP); Jiro Amano, Shizuoka (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 09/868,296

(22) PCT Filed: Dec. 10, 1999

(86) PCT No.: PCT/JP99/06947

§ 371 (c)(1),
(2), (4) Date: Jun. 15, 2001

(87) PCT Pub. No.: WO00/36209

PCT Pub. Date: Jun. 22, 2000

(30) Foreign Application Priority Data

Dec. 17, 1998 (JP) .......................................... 10-358551

(51) Int. Cl.[7] .................................................. B32B 5/18
(52) U.S. Cl. ........................ 442/76; 428/343; 428/346; 428/354; 428/355 EP; 428/361; 428/368; 428/375; 442/64; 442/66; 442/71; 442/85; 442/86; 442/88; 442/149; 442/150; 442/374
(58) Field of Search ............................ 442/64, 66, 71, 442/76, 85, 86, 88, 149, 150, 374, 77; 428/343, 346, 354, 355 EP, 361, 364, 365, 368, 375, 378

(56) References Cited

U.S. PATENT DOCUMENTS 4,596,854 A * 6/1986 Yotsumoto et al. ......... 525/133

* cited by examiner

Primary Examiner—Arti R. Singh
(74) Attorney, Agent, or Firm—Piper Rudnick LLP

(57) ABSTRACT

The present invention provides a highly durable, moisture-permeable, waterproof material that is high in moisture-permeability and waterproofness and able to achieve good adhesion with such a coat layer as moisture-permeable, water-resistant layer and with such a fibrous structural material as fabric, and a method for the production thereof.

The moisture-permeable, waterproof material of the invention comprises a moisture-permeable, water-resistant layer, a fibrous structural material, and a water-swellable adhesive layer interposed between the former two to adhere them together, wherein the surfaces of the single fibers comprising said fibrous structural material are coated with a pre-treating agent containing a polyhydric compound as main component, said fibrous structural material and said water-swellable adhesive layer being adhered via the pre-treating agent.

The moisture-permeable, waterproof material can be produced by the following steps: coating a moisture-permeable, water-resistant layer with a water-swellable adhesive layer, the latter being the outermost, to form film; and pressure-bonding a fibrous structural material pre-treated with a pre-treating agent containing a polyhydric compound as main component to said water-swellable adhesive layer, thereby adhering said fibrous structural material and said water-swellable adhesive layer together.

The moisture-permeable, waterproof material can serve to produce outdoor wear such as fishing wear and mountaineering wear; ski wear, windbreakers, athletic wear, golf wear, rain wear, and casual coats; as well as outdoor working wear, gloves, and shoes.

16 Claims, No Drawings ent invention is to provide a moisture-permeable, waterproof material
WATER VAPOR-PERMEABLE AND WATERPROOF MATERIAL AND METHOD FOR MANUFACTURING THE SAME

TECHNICAL FIELD

The present invention relates to a moisture-permeable, waterproof material and a method for the production thereof. More specifically the present invention relates to a moisture-permeable, waterproof, highly durable material that comprises a film layer such as a moisture-permeable, water-resistant layer firmly adhered to a fibrous structural material such as fabric, and also relates to a method for the production thereof.

Conventionally, moisture-permeable, waterproof materials, particularly laminate-type ones that consist of a film layer and a fabric layer adhered to each other, are produced by using an adhesive to attach such film and fabric layers to each other. More specifically, an adhesive is applied to film or fabric, and the film and the fabric are pressure-bonded, followed by curing the adhesive to thereby adhere them together.

In recent years, moisture-permeable, waterproof materials are required to be more comfortable, and adhesive layers with higher moisture-permeability have been sought in order to provide more comfortable materials. For this purpose, water-swellable polymer compounds with higher moisture-permeability have been in wider use as adhesive material.

Although such a water-swellable polymer compound serving as adhesive can improve the moisture-permeability of a moisture-permeable, waterproof material, the water-swellability of the adhesive layer impairs the adhesion with fibrous structural material, especially when moistened, contributing to lowering the durability against washing.

As described above, it is highly desirable presently to develop a water-swellable polymer compound that can achieve improved adhesion in a moistened condition.

DISCLOSURE OF THE INVENTION

In view of the foregoing, the object of the present invention is to provide a moisture-permeable, waterproof material that is high in permeability and water-resistance, able to maintain good adhesion between a film layer such as a moisture-permeable, water-resistant layer and a fibrous structural material, and high in bond durability in a moistened condition such as during washing, and to provide a method for the production thereof.

The moisture-permeable, waterproof material of the present invention has the following constitution to overcome the above-mentioned problems.

Thus, the present invention provides a moisture-permeable, waterproof material comprising a moisture-permeable, water-resistant layer and a fibrous structural material, with a water-swellable adhesive layer interposed between the former two to adhere them together, wherein the surfaces of single fibers comprising the fibrous structural material are coated with a pre-treating agent containing a polyhydric compound as main component, said fibrous structural material and said water-swellable adhesive layer being adhered by said pre-treating agent.

In preferred embodiments of the present invention, the moisture-permeable, waterproof material is characterized by the following features:

(a) Said pre-treating agent is a resin that contains a phenol resin derivative as main component;

(b) Said water-swellable adhesive layer is composed of a mixture of a water-swellable polyurethane and a polyhydric alcohol derivative, and crosslinked by a polyisocyanate;

(c) Said ratio of the number of ethylene glycol units that constitute the polyethylene glycol in the polyol to the number of isocyanate units that constitute said water-swellable polyurethane, is 20 or more and less than 30;

(d) Said polyhydric alcohol derivative is a glycerol derivative;

(e) Said polyisocyanate is an aliphatic isocyanate derivative;

(f) Said adhesive layer is a continuous resin layer; and (g) Said moisture-permeable, water-resistant layer is a continuous resin layer containing polyurethane as main component.

The production method of the moisture-permeable, waterproof material of the present invention has the following constitution.

Specifically, the production method of the moisture-permeable, waterproof material comprises the following steps: coating a moisture-permeable, water-resistant layer with a water-swellable, adhesive layer, the latter being the outermost, to form film; and pressure-bonding a fibrous structural material pre-treated with a pre-treating agent containing a polyhydric compound as main component, to the water-swellable, adhesive layer, to thereby adhere the water-swellable, adhesive layer and the fibrous structural material together.

In preferred embodiments of the present invention, the production method of the moisture-permeable, waterproof material is characterized by the following features:

(a) Said pre-treatment is carried out by impregnating an aqueous solution of a pre-treating agent into the fibrous structural material, followed by heat-treatment for fixing;

(b) Said pre-treatment is carried out by allowing the fibrous structural material to absorb and fix the pre-treating agent a bath.

The above-described constitution of the present invention provides material that has a single fiber surface with high wettability by a water-swellable, adhesive layer and that contains highly crosslinkable functional groups to achieve high adhesiveness, particularly in a moistened state, even when a water-swellable, highly moisture-permeable adhesive layer is used.

BEST MODES FOR CARRYING OUT THE INVENTION

The moisture-permeable, waterproof material of the present invention comprises a moisture-permeable, water-resistant layer, a fibrous structural material, and a water-swellable, adhesive layer interposed between the former two to adhere them together.

The "moisture-permeable, water-resistant layer" as used herein refers to a film layer having both moisture-permeability and waterproofness.

The "moisture-permeability" of the moisture-permeable, water-resistant layer refers to ability to allow sweat vapor or liquid sweat generated inside clothing to pass through the film, thereby discharging the sweat vapor or liquid sweat to the outside of the clothing. The "waterproofness" refers to ability to block out water droplets of rain or snow so as not to allow them to pass through the film to the inside of the clothing.

Specifically, typical moisture-permeable, water-resistant layer include dry, non-porous film of a polyurethane resin;

wet, porous film of a polyurethane resin; non-porous film of a hydrophilic polyester elastomer resin; and stretched porous film of a polytetrafluoroethylene. The moisture-permeable, water-resistant layer of the present invention is preferably a continuous (the meaning of "continuous" will be described hereinafter) resin layer containing polyurethane as main component because such a layer serves to provide material with good texture and particularly with high stretching capability and cold resistance.

In order to achieve desired properties such as moisture-permeability, durability, and texture of the material obtained after the completion of adhesion, the thickness of the moisture-permeable, water-resistant layer is preferably 5–50 µm, more preferably 10–30 µm.

Such a moisture-permeable, water-resistant layer is then adhered to a fibrous structural material by means of adhesive force of a water-swellable adhesive layer interposed between them.

Preferred adhesives constituting a water-swellable adhesive layer as used in the present invention include solvent-based adhesives such as urethane resin, acrylic resin, and vinyl acetate resin; other types of adhesives in such forms as emulsion, hot-melt, and reactive hot-melt; and adhesives consisting of two or more of the above-listed ones. Urethane resin adhesives are preferred because they adhere strongly to materials used for the moisture-permeable, water-resistant layer and the fibrous structural material while maintaining moisture permeability.

The "water-swellability" used herein refers to a property of a resin to swell by the effect of moisture (in vapor state) or water (in liquid state) absorbed among polymer molecules to allow large amounts of water molecules to be sorbed among polymer molecules, resulting in swelling of the resin into which water is incorporated.

In order to achieve desired properties such as moisture-permeability, durability, and texture of the material obtained after the completion of adhesion, the thickness of the adhesive layer is preferably 10–100 µm, more preferably 20–40 µm.

For the present invention, it is important that the surfaces of single fibers that constitute said fibrous structural material to which said moisture-permeable, water-resistant layer is adhered together, with said water-swellable adhesive layer in between, is coated with a pre-treating agent.

If the single fibers are treated with a pre-treating agent, the pre-treating agent is present between the adhesive and the single fibers, thereby enhancing the adhesion between the adhesive and the single fibers. As a result, the moisture-permeable, water-resistant layer is firmly fixed to the fibrous structural material. Furthermore, wettability by the adhesive and the degree of crosslinking can be improved.

When the surfaces of the single fibers are treated with a pre-treating agent, part of or entire surfaces of the single fibers may be coated with the pre-treating agent, or the pre-treating agent may be exhausted into surface layers of the single fibers.

The pre-treating agent used in the present invention contains a polyhydric compound as main component. When the surfaces of the single fibers are pre-treated with such a pre-treating agent, the adhesion is enhanced because hydroxyl groups present on the surfaces of the single fibers significantly improves wettability by the adhesive and the degree of crosslinking.

The pre-treating agent used in the present invention is preferably a compound having two or more hydroxyl groups. As such compounds having two or more hydroxyl groups, polyhydric phenol derivatives are particularly preferred. The "polyhydric phenol derivative" used herein refers to polymerized phenol derivatives and modified forms of such derivatives. Among such compounds, sulfonated novolac resin is preferred, though the present invention is not limited to such compounds.

Said above-described water-swellable adhesive layer used in the present invention is preferably a mixture of a water-swellable polyurethane and a polyhydric alcohol derivative.

The "water-swellable polyurethane" used herein refers to a polyurethane that possesses the following characteristics: When a continuous film made of such a polyurethane, used as the sole component, is immersed in water, the film swells with a linear swelling rate of 3% or more.

In order to achieve a sufficient permeability, a polyurethane resin having a linear swelling rate of 5% or more, more preferably 10% or more, should be used.

If a polyurethane resin is used as said water-swellable adhesive layer, said fibrous structural material combined with said water-swellable adhesive layer will have excellent texture and stretchability, and even when film layers having different thicknesses are laminated, the layers can coordinate very closely with each other.

Preferred polyurethane resins include copolymers produced by reacting a polyisocyanate with a polyol.

Preferred isocyanate components include aromatic diisocyanates and aliphatic diisocyanates, which may be used singly or in combination.

Such components include tolylene diisocyanates, 4,4'-diphenylmethane diisocyanate, 4,4'-methylenebis (cyclohexylisocyanate), hexamethylene diisocyanate, xylylene diisocyanate, and isophorone diisocyanate. Preferred polyol components include polyether polyols and polyester polyols. Preferred polyether polyols include polyethylene glycol, polypropylene glycol, and polytetramethylene glycol. Preferred polyester polyols include reaction products of a diol such as ethylene glycol and propylene glycol and a diacid such as adipic acid and sebacic acid; and a ring-opened polymerization product such as caprolacton. Alternatively, other components such as those based on ether/ester, amide, or carbonate may be used as required.

For the present invention, said polyisocyanate should be 4,4'-diphenylmethane diisocyanate or 4,4'-methylene bis (cyclohexylisocyanate) to maintain or enhance the tensile strength of the resin, and said polyol should be a polyurethane resin containing polyethylene glycol as major component to achieve a high moisture permeability.

Preferred polyhydric alcohol derivatives include monomers such as ethylene glycol, propylene glycol, tetramethylene glycol, glycerol, and trimethylpropanol; polymers derived from said monomers; and compounds having one or more reactive terminal groups such as glycidylether.

If such a polyhydric alcohol derivative is added up to not less than 3 wt % and less than 50 wt %, preferably not less than 10 wt % and less than 30 wt %, relative to the weight of the water-swellable polyurethane, the wettability and initial tackiness between the adhesive and the pre-treating agent during the adhesion process can be significantly enhanced, resulting in an significantly improved adhesion while preventing the lowering of moisture permeability from being caused by crosslinking.

Preferably, said mixture of a water-swellable polyurethane and a polyhydric alcohol derivative is crosslinked through isocyanate, and said mixture is also crosslinked with the pre-treating agent layer that coats the fibrous structural material.

The polyisocyanates that can be used herein include aromatic polyisocyanates and aliphatic polyisocyanates, which include dimmers and trimers such as tolylene diisocyanates, 4,4'-diphenylmethane diisocyanate, 4,4'-methylenebis(cyclohexylisocyanate), hexamethylene diisocyanate, xylylene diisocyanates, and isophorone diisocyanate; and trimers produced from foregoing ones modified with trimethylpropane; as required.

When such a polyisocyanate is added up to not less than 3 wt % and less than 50 wt %, preferably not less than 10 wt % and less than 30 wt %, relative to the weight of the water-swellable polyurethane, and then reacted, the adhesive layer undergoes crosslinking with the pre-treating agent to thereby develop and maintain adhesiveness and moisture permeability.

For the present invention, the ratio of the number of the isocyanate units contained in the water-swellable polyurethane in the adhesive layer to the number of the ethylene glycol units contained in the polyol should preferably be not less than 20 and less than 30 to develop high moisture permeability.

As described above, when a polyurethane that is high in the proportion of the soft segments to the hard segments and contains hydrophilic soft segments is used, higher moisture permeability can be retained after the completion of crosslinking.

Moreover, a water-soluble polyhydric alcohol derivative is preferably used as the polyhydric alcohol derivative in order to retain moisture permeability. Said polyhydric alcohol derivative can be used in combination with other compounds. Such other polyhydric alcohol derivatives that can be used in combination include glycerol derivatives, glycerol being particularly preferred, because they serve to maintain stability and safety when used in combination.

The polyisocyanate used for crosslinking of the water-swellable adhesive layer is preferably an aliphatic isocyanate derivative.

A polyisocyanate of non-yellowing type is more suitable because the water-swellable adhesive layer comes into contact with the fibrous structural material. In order to regulate the reactivity during crosslinking, dimers and trimers of hexamethylene diisocyanates or trimers produced from foregoing ones modified with a modifier such as trimethylpropane are preferred.

For the present invention, said water-swellable adhesive layer attached to said fibrous structural material is preferably a continuous resin layer. The term "continuous resin layer" used herein refers to two-dimensionally continuous resin film, free of any discontinuous portion, over the entire region that is adhered to the fibrous structural material. When a continuous layer is used, lowering of water pressure resistance due to film rupture, which may occur when so-called point adhesion is performed, can be significantly suppressed, and film surface rupture due to abrasion can be significantly reduced. The use of a high moisture-permeability adhesive layer significantly serves to prevent the lowering of moisture-permeability from being caused by adhesion over the entire surface, resulting in excellent moisture permeability and water resistance achieved simultaneously.

Useful fibrous structural materials for the present invention include, but not limited to, woven, knitted, nonwoven, and other fabrics made of fibers such as synthetic ones based on polyester, polyamide, or acrylate, as well as cotton, wool, and silk. Preferred fibrous structural materials include fabrics commonly used for clothing, particularly fabrics produced from polyester fibers such as polyethylene terephthalate, polypropylene terephthalate, and polybutylene terephthalate, or from polyamide fibers such as nylon 6 and nylon 66.

For the present invention, the "moisture-permeable, waterproof material" refers to a material having both moisture permeability and waterproofness.

The "moisture permeability" of said moisture-permeable, waterproof material refers to the same ability as the "moisture-permeability" defined for said moisture-permeable, water-resistant layer. In other words, the moisture-permeability is the ability to allow sweat vapor or liquid sweat generated inside clothing to pass through the film, thereby discharging the sweat vapor or liquid sweat to outside the clothing. The moisture permeability of the material of the present invention is 10,000 to 40,000 g/m$^2$·24 hr, preferably 15,000 to 35,000 g/m$^2$·24 hr.

The "waterproofness" refers to the ability to block out water droplets of rain or snow so as not to allow them to pass through the film surface to inside the clothing. The waterproofness of the material of the present invention, when expressed by water pressure resistance, is 2.0 kgf/cm$^2$ (1.96 MPa) or higher, preferably 3.0 kgf/cm$^2$ (2.94 MPa) or higher.

The production method of said moisture-permeable, waterproof material of the present invention is described below.

Said moisture-permeable, waterproof material can be produced by coating a moisture-permeable, water-resistant layer with a water-swellable adhesive layer, the latter being the outermost, and allow film to be formed by removing solvents and other substances, if such solvents or substances are used, during the coating process, followed by pressure-bonding a fibrous structural material, pre-treated with a pre-treating agent containing a polyhydric compound as main component, to said water-swellable adhesive layer to achieve adhesion.

Specifically, an adhesive is firstly applied over a moisture-permeable, water-resistant layer, which may be attached to a release support, by a coating technique such as knife-over-roll coating, direct-roll coating, reverse-roll coating, or gravure coating, while adjusting he amount of the adhesive so as to obtain an adhesive layer of a desired thickness, followed by drying at 50 to 150° C. for 0.5 to 10 minutes, to thereby produce film. In order to produce a continuous adhesive layer, the knife-coating technique is preferred.

The release support may be a sheet-like substrate having a smooth surface with low affinity to the resin film formed thereon. Examples of such a release support include film and paper. Generally, release paper or film with silicone resin applied thereon or release paper laminated with polypropylene is preferably used as said release support.

Subsequently, a fibrous structural material pre-treated with a substance such as a polyhydric compound is pressure-bonded over the adhesive layer so as to adhere the fibrous structural material and the adhesive layer together, to thereby produce a moisture-permeable, waterproof material. In other words, specifically, a fibrous structural material pre-treated with a pre-treating agent is placed over a sheet comprising said moisture-permeable, water-resistant layer laminated with said adhesive layer produced as described above, followed by applying a pressure, to thereby adhere the resin layer, i.e., the moisture-permeable, water-resistant layer, and the fibrous structural material together with the adhesive layer interposed in between.

The "pressure bonding" used herein refers to applying a pressure by pressing so as to ensure adhesion. For example, a resin layer supported on a release support is attached to a fibrous structural material to form a laminate, which is then allowed to pass between two rolls that are pressed against each other, thereby adhering the fibrous structural material and the resin layer together. During this process, an appropriate pressure may be applied between the rolls while heating them to remelt the adhesive layer, thereby enhancing the adhesion.

When a release support is used, the moisture-permeable, waterproof material is aged after removing it from the release support, or aging is performed first, followed by removing the moisture-permeable, waterproof material from the release support. The surface of the fibrous structural material comprising the resulting moisture-permeable, waterproof material may be subjected to water repellent treatment, as required, by a known technique.

The pre-treatment for the present invention may be performed by impregnating an aqueous solution containing a pre-treating agent into a fibrous structural material, followed by heat treatment to ensure fixation, or it may be performed by allowing a pre-treating agent to be entirely absorbed and fixed in the fibrous structural material in a bath.

The former method, i.e., impregnation of an aqueous solution of a pre-treating agent into a fibrous structural material, followed by heat treatment for fixation, may be performed as follows: A treatment solution of a desirable concentration, which has been determined according to the pickup of the fibrous structural material, is impregnated into the fibrous structural material, which is squeezed with a mangle, followed by heat treatment for fixation. If a sufficient durability cannot be achieved by the above-mentioned procedure, a crosslinkable resin may be used in combination as required.

The latter method, i.e., complete absorption and fixation of a pre-treating agent in a fibrous structural material in a bath, may be performed as follows: An aqueous solution containing a pre-treating agent is impregnated into a fibrous structural material, and the bath is heated so as to allow the fibers constituting the fibrous structural material to absorb completely the pre-treating agent to ensure its fixation.

By utilizing the effects described above, the moisture-permeable, waterproof material of the present invention can serve to produce outdoor wear such as fishing wear and mountaineering wear; ski wear, windbreakers, athletic wear, golf wear, rain wear, and casual coats; as well as outdoor working wear, gloves, and shoes.

EXAMPLES

The present invention will be described more specifically below by way of examples. Substrate cloth and evaluation methods used for the present invention are as follows.
Substrate Cloth
(1) Taffeta Made of Nylon 6 Fiber
yarn type: warp 70 denier (77.7 dtex)–68 filaments
weft 70 denier (77.7 dtex)–68 filaments
weave density: 116×88 yarns/inch
metsuke: 72 g/m$^2$
(2) Taffeta Made of Polyethylene Terephthalate Fibers
yarn type: warp 75 denier (83.3 dtex)–72 filaments
weft 75 denier (83.3 dtex)–72 filaments
weave density: 110×95 yarns/inch
metsuke: 150 g/m$^2$
Moisture permeability:
Measured in accordance with JIS L 1099 "Potassium Acetate Method"
Water Pressure Resistance:
Measured in accordance with JIS L 1092 "High Water Pressure Method"
Peel Strength in a Moistened Condition:
Peel strength of specimens immersed in water for 5 minutes were measured.
Durability Against Continuous Washing:
Specimens were washed continuously until lifting of the film, which was caused by separation of the film surface layer from the substrate cloth, showed up. Durability against continuous washing of each specimen was judged according to the time from beginning of the test until the appearance of lifting. If the time is 100 hours or longer, the specimen is considered as durable.

Example 1

(1) Production of a Taffeta Made of Primer-treated Nylon Fiber

A 1.2% aqueous solution of a sulfonated product of a low molecular weight novolac resin was prepared, and pH of the solution was adjusted with acetic acid and sulfuric acid to about 2.4. The aqueous solution thus obtained was impregnated (2-dip/2-nip) into a taffeta made of nylon fibers. The resulting taffeta was dried at 120° C. for 2 minutes, followed by washing with water and drying at 110° C., to thereby provide a taffeta made of nylon fiber treated with the pre-treating agent.

(2) Preparation of a Resin Solution for Moisture-permeable, Water-resistant Layer Production A water-swellable polyurethane resin produced from 4,4'-diphenylmethane diisocyanates serving as the isocyanate component, wherein the ratio of the number of ethylene glycol units in the polyethylene glycol in the polyol to the number of isocyanate units was 8.4, was dissolved in a mixed solvent containing 39 parts by weight of dimethylformamide and 61 parts by weight of methylethylketone, to thereby provide a 23 wt % solution.

(3) Preparation of a Resin Solution Used for Adhesive Layer Production

A water-swellable polyurethane resin produced from 4,4'-methylenebis (cyclohexylIsocyanate) serving as the isocyanate component, wherein the ratio of the number of ethylene glycol units in the polyethylene glycol in the polyol to the number of isocyanates was 27, was dissolved in a mixed solvent containing 58 parts by weight of dimethylformamide, 27 parts by weight of methylethylketone, and 15 parts by weight of toluene, to thereby provide a 23 wt % solution. To the solution, glycerol isocyanurate-connected hexamethylene diisocyanate, which is a trimer of hexamethylene diisocyanate, were added up to 22 wt % and 10 wt %, respectively, relative to the total weight of the resin, to prepare a resin solution to be used for adhesive layer production.

Subsequently, the resin solution for moisture-permeable, water-resistant layer production was applied over a release paper using a knife coater with a clearance of 100 µm, followed by drying at 120° C. for 2 minutes, to thereby produce a film.

Then, the resin solution for adhesive layer production was applied over the resulting moisture-permeable, water-resistant layer using a knife coater with a clearance of 15 µm, followed by drying at 120° C. for 2 minutes, to thereby produce film. The taffeta made of nylon fibers treated with the pre-treating agent was attached to the adhesive layer, and the laminated material thus obtained was allowed to pass between hot rolls that consisted of a metallic roll and a rubber roll and operated at a linear load of 1.2 kg/cm, a metallic roll temperature of 130° C., and a travel speed of 5.7 m/min, to attach the adhesive layer closely to the taffeta made of nylon fiber together, followed by passing the resulting material between the hot rolls operating at a linear load of 8.9 kg/cm, a metallic roll temperature of 130° C., and a travel speed of 5.7 m/min, to thereby adhere the layers together.

After the adhesion, the release paper was removed, and the specimen was aged at room temperature for 48 hours. After the aging, the surface of the substrate cloth (i.e., the surface of the taffeta made of nylon fibers) was subjected to water-repellent treatment using a gravure coater, followed by curing at 160° C. for 2 minutes, to thereby produce a moisture-permeable, waterproof material of the present invention.

The resulting moisture-permeable, waterproof material had a moisture permeability of 23,000 g/m$^2$·24 hr and water pressure resistance of 3.0 kgf/cm$^2$ (2.94 MPa), which indicate high moisture-permeability and high waterproofness, as well as a peel strength in a moistened condition of 320 g/cm and a durability against continuous washing of not less than 100 hours, which indicate high durability.

Example 2

(1) Production of Taffeta Made of Polyester Fiber Treated with a Pre-treating Agent A 1.2% aqueous solution of a sulfonated product of a low molecular weight novolac resin was prepared, and pH of the solution was adjusted to 7 with sodium hydroxide, followed by addition of methylol melamine resin, serving as a cross-linking agent, up to a content of 0.5%. The aqueous solution obtained was impregnated (2 dip/2 nip) into a taffeta made of polyester fiber, followed by drying at 120° C. for 2 minutes. After the drying, the resultant product was washed with water and further dried at 110° C., to provide a taffeta made of polyester fiber treated with the pre-treating agent.

The same procedure as in Example 1 was carried out except that a polyester textile (i.e., taffeta) was used as the substrate cloth (i.e., fibrous structural material) instead of taffeta made of nylon fiber, to produce a moisture-permeable, waterproof material.

The resulting moisture-permeable, waterproof material had a moisture permeability of 31,000 g/m$^2$·24 hr and water pressure resistance of 3.0 kgf/cm$^2$ (2.94 MPa), which indicate high moisture-permeability and high waterproofness, as well as a peel strength in a moistened condition of 290 g/cm and a durability against continuous washing of not less than 100 hours, which indicate high durability.

Example 3

The same procedure as in Example 1 was carried out except that Hytrel 8071 film (30 μm), which is a block copolymer consisting of polybutylene terephthalate, serving as hard segments, and a polyether, serving as soft segments, was used as the moisture-permeable, water-resistant layer, to produce a moisture-permeable, waterproof material.

The resulting moisture-permeable, waterproof material had a moisture permeability of 18,000 g/m$^2$·24 hr and water pressure resistance of 3.0 kgf/cm$^2$ (2.94 MPa), which indicate high moisture-permeability and high waterproofness, as well as a peel strength in a moistened condition of 300 g/cm and a durability against continuous washing of not less than 100 hours, which indicate high durability.

Example 4

The same procedure as in Example 1 was carried out except that Hytrel 8071 film (30 μm), which is a block copolymer consisting of polybutylene terephthalate, serving as hard segments, and a polyether, serving as soft segments, was used as, the moisture-permeable, water-resistant layer, to produce a moisture-permeable, waterproof material.

The resulting moisture-permeable, waterproof material had a moisture permeability of 26,000 g/m$^2$·24 hr and water pressure resistance of 3.0 kgf/cm$^2$ (2.94 MPa), which indicate high moisture permeability and high waterproofness, as well as a peel strength in a moistened condition of 300 g/cm and a durability against continuous washing of not less than 100 hours, which indicate high durability.

Example 5

The same procedure as in Example 1 was carried out except that glycerol was not added in preparing a resin solution for adhesive layer production, to produce a moisture-permeable, waterproof material.

The resulting moisture-permeable, waterproof material had a moisture permeability of 16,000 g/m$^2$·24 hr and water pressure resistance of 3.0 kgf/cm$^2$ (2.94 MPa), which indicate high moisture-permeability and high waterproofness, as well as a peel strength in a moistened condition of 160 g/cm and a durability against continuous washing of not less than 100 hours, which indicate high durability.

Comparative Example 1

The same procedure as in Example 1 was carried out except that a taffeta made of nylon fiber that was not treated with any pre-treating agent was used, to produce a moisture-permeable, waterproof material.

The resulting moisture-permeable, waterproof material had a moisture permeability of 23,000 g/m$^2$·24 hr and water pressure resistance of 3.0 kgf/cm$^2$ (2.94 MPa), which indicate high moisture-permeability and high waterproofness, but had a peel strength in a moistened condition of 110 g/cm and a durability against continuous washing of less than 24 hours, which indicate poor durability.

Comparative Example 2

The same procedure as in Example 1 was carried out except that a taffeta made of polyester fiber which was not treated with any pre-treating agent was used, to produce a moisture-permeable, waterproof material.

The resulting moisture-permeable, waterproof material had a moisture permeability of 32,000 g/m$^2$·24 hr and water pressure resistance of 3.0 kgf/cm$^2$ (2.94 MPa), which indicate high moisture-permeability and high waterproofness, but had a peel strength in a moistened condition of 240 g/cm and a durability against continuous washing of less than 24 hours, which indicate poor durability.

Industrial Applicability

The above-described constitution of the present invention provides material that has a single fiber surface with high wettability by a water-swellable, adhesive layer and that contains highly crosslinkable functional groups to achieve high adhesiveness, particularly in a moistened state, even when a water-swellable, highly moisture-permeable adhesive layer is used. Consequently, a moisture-permeable, waterproof material endowed with high moisture-permeability and excellent waterproofness as well as high film strength can be produced, making it possible to expanded the range of application of laminated materials.

By utilizing the effects described above, the moisture-permeable, waterproof material of the present invention can serve to produce outdoor wear such as fishing wear and mountaineering wear; ski wear, windbreakers, athletic wear, golf wear, rain wear, and casual coats; as well as outdoor working wear, gloves, and shoes.

What is claimed is:

1. A moisture-permeable, waterproof material comprising a moisture-permeable, water-resistant layer, a fibrous structural material, and a water-swellable adhesive layer interposed between the former two to adhere them together; wherein the surfaces of the single fibers that constitute said fibrous structural material are coated with a pre-treating agent containing a polyhydric compound as main component, and said moisture-permeable, water-resistant layer and said fibrous structural material are adhered together via said pre-treating agent.

2. A moisture-permeable, waterproof material according to claim 1, wherein said pre-treating agent is a resin containing a phenol resin derivative as main component.

3. A moisture-permeable, waterproof material according to claim 1 or 2, wherein said water-swellable adhesive layer comprises a mixture of a water-swellable polyurethane and a polyhydric alcohol derivative, and is crosslinked with a polyisocyanate.

4. A moisture-permeable, waterproof material according to claim 3, wherein the ratio of the number of ethylene glycol units constituting the polyethylene glycol in the polyol to the number of isocyanate units constituting said moisture-permeable, waterproof polyurethane, is not less than 20 and less than 30.

5. A moisture-permeable, waterproof material according to claim 3, wherein said polyhydric alcohol derivative is a glycerol derivative.

6. A moisture-permeable, waterproof material according to claim 3, wherein said polyisocyanate is an aliphatic isocyanate.

7. A moisture-permeable, waterproof material according to claim 1, wherein said adhesive layer is a continuous resin layer.

8. A moisture-permeable, waterproof material according to claim 1, wherein said moisture-permeable, water-resistant layer is a continuous resin layer containing polyurethane as main component.

9. A moisture-permeable, waterproof material comprising:
   a moisture-permeable, water-resistant layer,
   a fibrous structural material,
   a pre-treating agent containing a polyhydric compound as a main component coated onto fibers forming said fibrous structural material, and
   a water-swellable adhesive layer interposed between said moisture-permeable, water-resistant layer and said fibrous structural material adhere said moisture-permeable, water-resistant layer and said fibrous structural material together.

10. The moisture-permeable, waterproof material according to claim 9, wherein said pre-treating agent is a resin containing a phenol resin derivative as main component.

11. The moisture-permeable, waterproof material according to claim 9, wherein said water-swellable adhesive layer comprises a mixture of a water-swellable polyurethane and a polyhydric alcohol derivative, and is crosslinked with a polyisocyanate.

12. The moisture-permeable, waterproof material according to claim 11, wherein the ratio of the number of ethylene glycol units constituting polyethylene glycol in the polyol to the number of isocyanate units constituting said moisture-permeable, waterproof polyurethane, is not less than 20 and less than 30.

13. The moisture-permeable, waterproof material according to claim 11, wherein said polyhydric alcohol derivative is a glycerol derivative.

14. The moisture-permeable, waterproof material according to claim 11, wherein said polyisocyanate is an aliphatic isocyanate.

15. The moisture-permeable, waterproof material according to claim 9, wherein said adhesive layer is a continuous resin layer.

16. The moisture-permeable, waterproof material according to claim 9, wherein said moisture-permeable, water-resistant layer is a continuous resin layer containing polyurethane as a main component.

* * * * *